United States Patent [19]
Oudewaal

[11] 3,822,593
[45] July 9, 1974

[54] CLINICAL THERMOMETER PROBE AND DISPOSABLE COVER THEREFOR

[75] Inventor: Martin J. Oudewaal, Del Mar, Calif.

[73] Assignee: Diatek, Inc., San Diego, Calif.

[22] Filed: Jan. 12, 1972

[21] Appl. No.: 217,371

[52] U.S. Cl. ......... 73/343 R, 73/362 AR, 150/52 R, 206/16.5, 338/28
[51] Int. Cl. ............................................. G01k 1/08
[58] Field of Search .................. 73/343 R, 362 AR; 206/16.5; 338/28; 215/95; 150/52 R

[56] References Cited
UNITED STATES PATENTS

| | | | |
|---|---|---|---|
| 1,848,333 | 3/1932 | Farren | 215/95 |
| 1,985,258 | 12/1934 | Mauser | 215/95 |
| 2,321,846 | 6/1943 | Obermaier | 73/362 AR |
| 3,254,533 | 6/1966 | Tongret | 73/343 R |
| 3,349,896 | 10/1967 | Ensign | 206/16.5 |

*Primary Examiner*—Richard C. Queisser
*Assistant Examiner*—Denis E. Corr
*Attorney, Agent, or Firm*—Limbach, Limbach & Sutton

[57] ABSTRACT

A hand-held elongated probe with a thermistor element at its end and a disposable sanitary cover therefor. The disposable cover has a thin flexible membrane at one end thereof. The membrane of the probe cover is normally held tightly at its end in a flat but substantially unstretched manner. When a cover is positively engaged with the probe, its membrane is stretched tightly about the thermistor unit to permit efficient heat transfer to the thermistor from the environment outside the probe cover.

9 Claims, 5 Drawing Figures

PATENTED JUL 9 1974  3,822,593
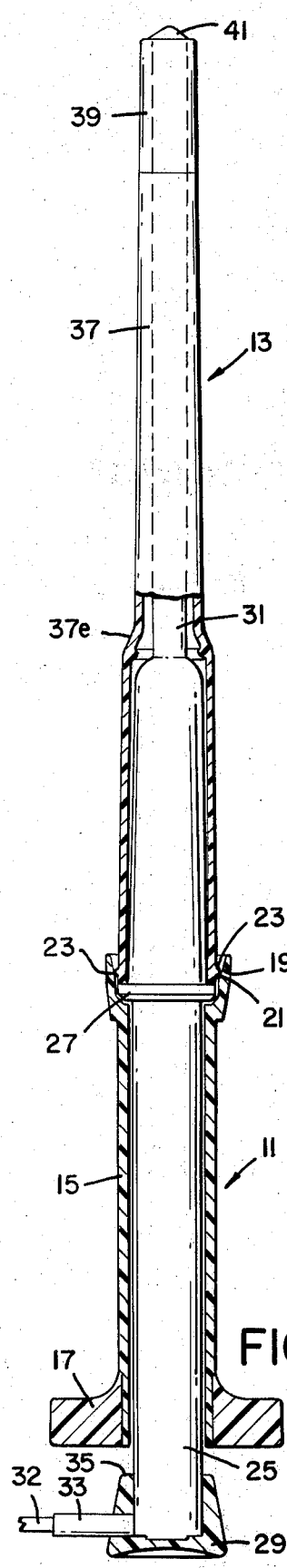
FIG_1
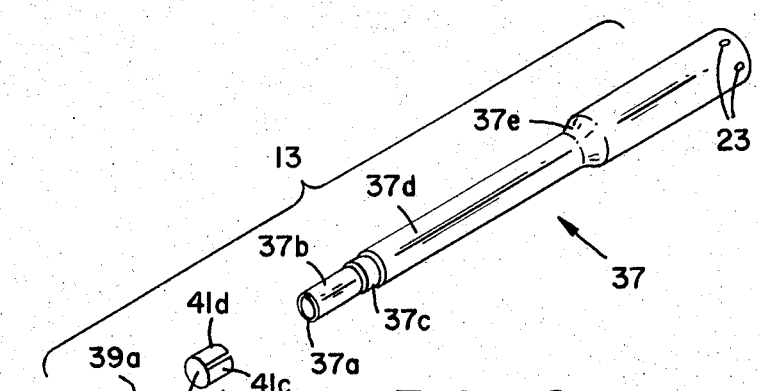
FIG_2
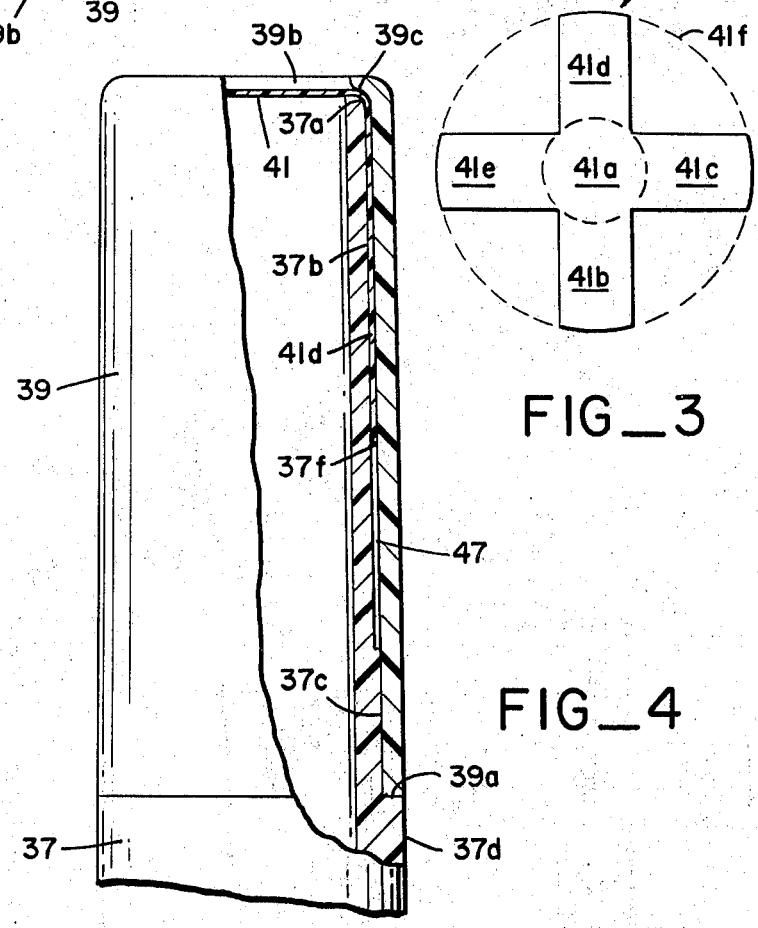
FIG_3
FIG_4
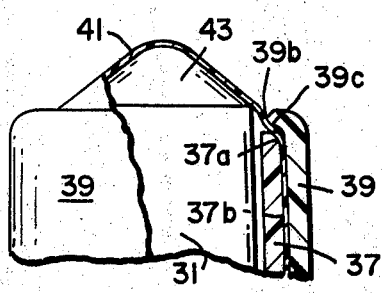
FIG_5

CLINICAL THERMOMETER PROBE AND DISPOSABLE COVER THEREFOR

BACKGROUND OF THE INVENTION

This invention relates generally to electronic clinical thermometers and more specifically to hand-held temperature sensing probes and disposable covers therefor.

Human and animal temperatures have long been determined orally and rectally by doctors and veterinarians with the use of a mercury in glass type of thermometer. A primary disadvantage of the mercury thermometer is the time delay of several minutes that is required for a temperature reading to be registered. In a hospital, for instance, where a nurse is taking the temperature of a large number of patients, this time delay adds up to a siginificant amount of the nurse's time. Furthermore, a mercury thermometer must be reset by the nurse by shaking and it must also be sterilized between patients. If the sterilization is incomplete, germs will be passed between patients.

Electronic thermometers have been suggested as a way of solving many of these disadvantages of the standard mercury thermometer. One digitally reading electronic thermometer now on the market utilizes a temperature probe with disposable probe covers so that a clean cover is used for each patient. This particular device, however, utilizes a metal tip at the end of each of its probe covers for heat transfer therethrough from the patient to an electrical temperature sensor in the probe. A significant disadvantage to this arrangement is that the metal tip absorbs heat energy from the object and thereby causes a time delay in making a temperature determination, due to recovery of temperature of the object. This disadvantage requires that extra equipment be included in the electronic circuits associated with the temperature sensor in order to compensate for this time delay.

Pat. No. 3,469,449 — Keller describes another type of electronic thermometer having a probe for sensing temperature and an elastomeric cover for fitting around the temperature sensing element. This cover, however, is not easily attached to or disengaged from the temperature sensing probe since the membrane is required to encapsulate the temperature sensor.

Therefore, it is a primary object of the present invention to provide a disposable cover with a flexible elastomeric tip constructed in a manner that the cover is easily attached to and removed from a temperature probe without sacrificing accurate temperature sensing with a probe cover in place.

It is also an object of the present invention to provide a disposable cover for an electrical temperature sensing element that does not significantly interfere with transfer of heat to the temperature sensing element from the environment.

SUMMARY OF THE INVENTION

Briefly, these and additional objects of the present invention are accomplished by a probe cover of generally a tubular shape having a flexible membrane rigidly attached at one end thereof and held normal to its axis. A temperature probe has a temperature sensing element held at the end of a rod. The probe cover is insertable over this rod in a manner that the membrane is stretched tightly around the temperature sensing element when the cover is positively interlocked onto the probe. The membrane is held tightly at the tip by the probe cover but normally in a substantially unstretched condition until inserted onto the probe. The membrane of each probe cover is thereby stretched substantially the same amount when the cover is positively latched onto the probe. This provides for a uniformity of heat transfer through each of the membranes to the temperature probe. Each of the membranes is preferably clamped on the outside surface of the tubularly shaped probe cover in order to prevent tearing.

Additional objects, advantages and structural features of the temperature sensing probe and disposable cover therefor are discussed in the following description taken in conjunction with the accompanying drawings.

BRIEF DESCRIPTION OF THE DRAWINGS

FIG. 1 is a partially cut away view of a temperature sensing probe and a disposable cover therefor according to the various aspects of the present invention;

FIG. 2 shows the parts of the probe cover of FIG. 1 in an exploded view;

FIG. 3 is another view of one of the parts of the probe cover of FIGS. 1 and 2;

FIG. 4 is an enlarged partially cut away view of the tip of the probe cover of FIGS. 1 and 2 before mounting on a probe; and FIG. 5 is an enlarged partially cross-sectioned view of the probe cover of FIGS. 1 and 2 when mounted on a temperature sensing probe.

DESCRIPTION OF THE PREFERRED EMBODIMENTS

Referring to FIG. 1, a temperature sensing probe 11 and a disposable probe cover 13 are shown assembled together. The probe 11 includes a hollow outer cylindrical member 15. A cylindrical handle member 17 is cemented to one end of the cylindrical member 15, thereby to form a combination which serves as a handle for manipulating the probe. The other end of the cylindrical member 15 is formed into a circular flare 19 which forms an opening of increasing inside diameter from the cylindrical member 15 outward thereof. An annular groove 21 is provided around the inside surface of the flare portion 19 and serves as one-half an interlocking or latching mechanism between the probe cover 13 and the probe 11. The probe cover 13 includes near one end thereof a plurality of projections 23 around the circumference of an otherwise smooth surface. Four projections 23 equally spaced around the probe cover 13 have been found satisfactory. The projections 23 are shaped to be received into the groove 21. As is explained hereinafter, a positive latching means which accurately positions the probe cover 13 longitudinally with respect to the probe 11 is highly desirable. Therefore, a system relying only on frictional engagement between the probe 11 and probe cover 13 is not as satisfactory as a positive latching mechanism such as that illustrated in FIG. 1.

Within the hollow cylindrical member 15 of the probe is a slidable core member 25 which has an outer cylindrical shape complementary to the interior dimensions of the outer cylindrical member 15. The slidable member 25 is constrained by a ring 27 molded as part thereof against movement out of the handle end of the cylindrical member 15. A knob 29 shaped with a depression for receiving a finger to push the slidable member 25 inward is cemented to the handle end of the cylindrical member 25. A rod 31 is rigidly attached to the slidable member 25 at its other end. The rod 31, as is described hereinafter, contains a temperature sensing element such as a thermistor at its end furthest removed from the slidable member 25. Electrical wires from the temperature sensing element are directed through the rod 31 and the slidable member 25. Wires 32 exit through a sleeve 33 at the knob 29. An electrical signal proportional to temperature at the sensing device is then processed and displayed by an appropriate electronic circuit.

The probe cover 13 is designed to be disposable and used only for a single human or animal temperature measurement. When the measurement has been completed, the operator depresses the knob 29 with respect to the handle member 17, thereby to exert a longitudinal force on the probe cover 13 at the ring 27 of the slidable member 25. Thus, the cooperating shapes of the annular groove 21 and the projections 23 are preferably rounded in order that the positive interlock between the probe and probe cover may be broken by forcing the slidable member 25 relative to the outer hollow cylindrical member 15. Also, the materials and thicknesses of the walls of the probe cover 13 and the flare portion 19 of the probe are such that a sufficient degree of flexibility exists which permits engagement and disengagement of the projections 23 in the annular groove 21 by a resilient snapping action. An edge 35 of the knob 29 determines the limit of travel permitted of the slidable member 25 relative to the outer cylindrical member 15 and is made to be sufficient to disengage the probe cover 13 therefrom.

The construction of the probe cover 13 and its cooperation with the temperature sensing device will now be described in detail. The probe cover 13 shown in its assembled form in FIG. 1 includes a main body 37 that is hollow and generally cylindrically shaped. A hollow cylindrically shaped sleeve 39 is frictionally engaged with the main body portion 37 in a manner to hold a membrane 41 rigidly at the tip of the probe cover 13. When the probe cover is positioned on a probe, a temperature sensing element 43 which is attached to the end of the rod 31 furthest removed from the handle causes the membrane 41 to be stretched and conform substantially to the outside shape of the temperature sensing element 43. The element 43 is shown in FIG. 5 to have a conical outside shape. The temperature sensing element is preferably a thermistor and is encapsulated in an epoxy resin. The rod 31 may be an epoxy tube. The outer shape of the temperature sensing element 43 is gently rounded so that the stretched membrane 41 will tightly conform to its surface without tearing. It has been found that the stretched membrane has little effect on heat transfer characteristics from the surroundings to the temperature sensor 43. It is highly desirable, of course, that the probe cover 13, which is used as a protective sanitary device, affect the temperature sensing operation as little as possible.

FIG. 2 shows an exploded view of the three parts of the probe cover 13. The main body portion 37 and the sleeve 39 are made of a fairly rigid plastic material such as polypropylene. The particular material used should have poor heat transfer characteristics and thus low absorption of heat, thereby to minimize the effect of the probe cover on the temperature measurements. The membrane 41 is a thin stretchable flexible plastic material. A high density copolymer polyethylene having a thickness of 2 mils. has been found satisfactory. Whatever material is used, the membrane 41 should be as thin as mechanically possible and have an elastic range which permits at least 150 percent elongation. A copolymer polyethylene has an elastic range that permits about a 600 percent elongation.

Referring to FIG. 3, the preferred shape of the membrane 41 for assembly as part of a probe cover 13 is shown in plan view. An area 41a in the middle of the membrane 41 is continuous without any breaks and has a minimum equal to the cross-section area at the tip 37a (FIG. 2) of an outer cylindrical surface 37b of the main body 37. Legs 41b, 41c, 41d and 41e are provided extending out from this central 41a as a means of fastening the membrane onto the main body portion 37. These legs form a cross-shaped membrane piece. The membrane may be formed by taking a circular piece of material of the shaped outlined at 41f and by cutting away pie-shaped portions between the desired legs. The legs 41b-e are then folded over along the outer cylindrical surface 37b near the tip 37a of the main body portion 37 (FIG. 4). The sleeve 39 is then pressed over the surface 37b and the membrane 41 is resultantly clamped at its legs 41b-e between the inner surface of the cylindrical sleeve 39 and the outer cylindrical surface 37b of the main body portion 37. The legs 41b-e of the membrane are preferably shaped so that their total remaining length around the circle 41f of FIG. 3 is approximately the same as the circumference of the cylindrical surface 37b at 37f in order to minimize overlap between the various legs of the membrane.

Referring specifically to FIG. 4, the structure for clamping the membrane 41 to the probe cover is shown in detail in an enlarged partially sectioned view of the tip. An outer cylindrical surface 37c of the main body portion 37 frictionally engages the inner cylindrical surface of the sleeve 39. Dimensions are made such that the fit is a very tight one so that once engaged, the sleeve 39 cannot be disengaged by hand. An abrupt edge on the main body portion 37 separates the circumferential surface 37c from a circumferential surface 37d and provides a ledge for an end 39a of the sleeve 39 to but up against. As can be seen from FIG. 4, the diameter of the cylindrical surface 37b adjacent the tip 37a of the probe is less than that of the adjacent cylindrical surface 37c, which in turn in less than that of the adjacent cylindrical surface 37d. No abrupt changes in diameter of the cylindrical interior surface of the sleeve 39 is provided, thereby leaving a space 47 between the sleeve 39 and the cylindrical surface 37b into which the legs 41b-e of the membrane 41 are held.

Each of the cylindrical surfaces 37b and 37c and the mating internal cylindrical surface of the sleeve 39 are made to uniformly taper with their smallest diameters at their edge nearest the tip of the probe cover. The reason for this is to clamp the membrane 41 in an optimum way during assembly of the probe cover 13. The membrane legs 41b-e are clamped within the space 47 only when the sleeve 39 is almost completely engaged on the main body portion 37 with its edge 39 a nearly in abutting relationship to the surface 37d. In this manner, the membrane 41 is not stretched any significant amount in the completed probe cover 13 but yet the membrane is firmly held at its tip.

It is preferred that the membrane of each probe cover 13 be under little or no tension so that the membrane thickness is substantially the same for each probe cover 13 when positioned on the probe 11. Therefore, to the limited extent that the membrane may affect heat transfer characteristics from the surroundings to the temperature sensing element, each probe cover will affect heat transfer in a predictable uniform manner.

The tip of the sleeve 39 contains a circular opening 39b through which the membrane 41 is forced outward by the temperature sensing element 43 (FIG. 5). An internal edge 39c of this opening 39b is smoothly rounded. The diameter of the opening 39b is made to be slightly smaller than the diameter of the circumferential surface 37b at the end 37a of the main body portion 37. This smaller diameter and the rounding at 39c and 37a result in the membrane 41 following an "S" shaped path around the ends 37a and 39c (FIG. 5). Contact of the membrane at these points when installed on the probe also provides an additional seal to isolate the probe from the outside environment with respect to fluids and germs which could cause its contamination. Providing the surfaces 37a and 39c as shown also contributes to holding the membrane 41 when stretched from being pushed out of the end of the probe cover.

It will also be noted that the length of the sleeve 39 and the length of the cylindrical surface portions 37b and 37c are adjusted relative to one another so that the membrane 41 is not pinched therebetween at around the surface 39c and the tip end 37a. Since it is desirable to use a very thin and flexible membrane 41, compression around the outer tip could cause the membrane to rupture and tear when stretched. Therefore, the system of clamping described herein, especially with respect to FIG. 4, is desirable because compressive forces are distributed over a wide area of the membrane and it thus does not tend to puncture of tear the membrane 41.

The sleeve 39 serves an additional function by overlapping the membrane 41 at the tip of the probe cover. This structure makes the membrane 41 recessed somewhat through the opening 39b from the extreme end of the probe and thus reduces the probability that the membrane 41 will be damaged while being transported or stored.

The outside surface of the main body portion 37 of the probe cover 13 abruptly changes diameter at 37e (FIG. 2). The surface 37e serves as a ledge for holding the cover 13 upright in a storage tray.

Several other optional features, not shown, can be added to the structure of the probe cover. One feature is the use of litmus paper or other material in the form of a ring near the tip of the probe cover 13 which, when exposed to saliva in the mouth, will change color. An indicator is thus provided so that used probe covers can be distinguished from new covers. Such a ring may conveniently be inserted over the main body portion 37 during assembly and particularly held around the cylindrical surface 37c and pinched by the surface 39a of the sleeve 39 to hold it in place. The probe cover 39 would then be made slightly shorter to accommodate the thickness of the paper ring. Also, for comfort of the patient, food flavoring can be added in an appropriate manner to the outside surface of the probe cover tip.

The various aspects of the present invention have been described with respect to preferred embodiments thereof, but it will be understood that the scope of the invention is defined by the appended claims.

I claim:

1. A disposable cover for a temperature sensing device, comprising:

a generally cylindrically shaped hollow tube that is open at a first end thereof for receiving a temperature sensing device, and a flexible and stretchable membrane securely held normally flat across said tube at a second end and substantially perpendicular to an axis of the tube by clamping the membrane to an outside surface of the tube adjacent its second end with a sleeve, said sleeve being hollow and generally cylindrically shaped with an interior surface cooperating with the outside surface of the cylindrical tube for frictional engagement therebetween when the sleeve is fully engaged over the second end of the tube, said sleeve having a circular opening at one end for positioning adjacent said second end of the tube, said sleeve opening having a diameter that is less than the diameter of the outside of the cylindrical surface of the tube at its second end, whereby said membrane contacts said sleeve opening when the membrane is stretched outward therethrough.

2. A disposable cover for a temperature probe, comprising, a hollow tube having first and second ends, said first end having a tip surface of substantially the cross-sectional area of the tube and said second end being open to receive a temperature probe, said tube having two contiguous outside cylindrical surface sections adjacent said first end that have the same degree of taper toward the first end but which have an abrupt change in diameter therebetween, a hollow cylindrically shaped sleeve having an inside surface with said degree of taper and tightly engaging the outside cylindrical surface section furthest removed from the tip, wherein one end of said sleeve extends beyond the tip of said tube and forms an opening having a diameter intermediate of the inside and outside diameter of the tube at its tip, and a flexible membrane held across the tip end of said hollow tube by clamping between the sleeve and the outside surface section of the tube immediately adjacent its tip.

3. A disposable cover for a temperature probe, comprising, a hollow tube having first and second ends, said first end having a tip surface of substantially the cross-sectional area of the tube and said second end being open to receive a temperature probe, said tube having two contiguous outside cylindrical surface sections adjacent said first end that have the same degree of taper toward the first end but which have an abrupt change in diameter therebetween, said tube additionally including a plurality of projections around its outside surface near the second end, a hollow cylindrically shaped sleeve having an inside surface with said degree of taper and tightly engaging the outside cylindrical surface section furthest removed from the tip, and a flexible membrane held across the tip end of said hollow tube by clamping between the sleeve and the outside surface section of the tube immediately adjacent its tip.

4. A temperature probe and disposable cover therefor, comprising:
a rigid handle having a rod extending therefrom, said rod including an electrical temperature sensing device at its end furthest removed from the handle,
a generally cylindrically shaped probe cover that is open at one end and which has a flexible membrane attached to its other end, and
mating positive latch means on said one end of the probe cover and on said probe handle for locking the probe cover in a position along said rod that the membrane is stretched tightly over a surface of an electrical temperature sensing device, said positive latch means including:
a sleeve as part of said handle surrounding said rod and flaring outwardly in a direction along said rod with a diameter at its opening that is larger than the outside diameter of said one end of the probe cover,
detent means in the inside surface of said flared sleeve a short distance from its opening, and
projection means extending from the outer surface of said probe cover near its said one end, said projection means being of a complementary shape to said detent means in the probe handle for positive engagement therewith when a probe cover is forced into said conically shaped portion of the handle.

5. A temperature probe and disposable cover therefor according to claim 4, wherein said temperature sensing device is a thermistor that is contained in a conically shaped housing.

6. A temperature probe and disposable cover therefor according to claim 4, wherein said detect means includes an annular groove and wherein said projection means includes a plurality of projections.

7. A temperature probe and a disposable cover therefor according to claim 4, wherein said handle includes means associated therewith for disengaging said positive latching means between the probe cover and the handle by exertion of force longitudinally along the axis of the handle and rod in a direction away from said handle.

8. A temperature probe and a disposable cover therefor, comprising:
a rigid handle having a rod extending therefrom, said rod including an electrical temperature sensing device at its end furthest removed from the handle,
a rigid generally cylindrically shaped probe cover that is open at one end and which has a flexible and stretchable membrane attached across its said other end,
a detent provided as part of said handle for latching said probe cover over said rod, and
a projection extending outward from the probe cover adjacent its said one end and cooperatively shaped with said detent for engagement therein.

9. A temperature probe, comprising:
a rigid generally cylindrical core member having a knob attached to one end, a rod attached to its other end, and a ring extending from the core cylindrical surface intermediate of its ends,
a temperature transducer attached to an end of said rod removed from its attachment to said bore member, and
a hollow cylindrical member positioned around said core member and slidable therealong, said hollow member having a cylindrical handle extending from one end and a circular flare at its other end positioned to project over said ring, said circular flare having an annular groove on its inside surface, whereby projections of a probe cover are received in said groove and the probe cover is removed by moving the hollow member relative to the core member to urge the probe cover projections out of the sleeve annular groove.

* * * * *